Figure 1:
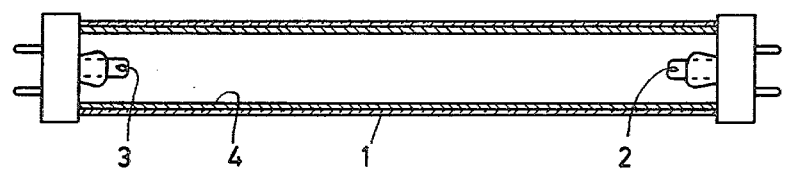

United States Patent [19]

van de Spijker et al.

[11] 4,233,538
[45] Nov. 11, 1980

[54] LUMINESCENT LEAD-ACTIVATED ALKALINE EARTH METAL RARE EARTH METAL BORATES AND MERCURY VAPOR DISCHARGE LAMP CONTAINING THE SAME

[75] Inventors: Willebrordus H. M. M. van de Spijker; Willem L. Konijnendijk, both of Eindhoven, Netherlands

[73] Assignee: U.S. Philips Corporation, New York, N.Y.

[21] Appl. No.: 31,244

[22] Filed: Apr. 18, 1979

[30] Foreign Application Priority Data

Apr. 20, 1978 [NL] Netherlands .................. 7804197

[51] Int. Cl.$^3$ ............................................. C09K 11/46
[52] U.S. Cl. .............................. 313/486; 252/301.4 R
[58] Field of Search .................. 252/301.4 R; 313/486

[56] References Cited

U.S. PATENT DOCUMENTS

| | | | |
|---|---|---|---|
| 2,270,124 | 1/1942 | Huniger et al. | 252/301.4 R X |
| 2,920,046 | 1/1960 | Ranby | 252/301.4 R |
| 3,423,325 | 1/1969 | Wanmaker et al. | 252/301.4 R |

*Primary Examiner*—Jack Cooper
*Attorney, Agent, or Firm*—Norman N. Spain

[57] ABSTRACT

Luminescent lead-activated alkaline earth metal rare earth metal borates having compositions defined by the formula $Me_{1-p}Pb_pLa_{1-x-y}Y_xGd_yBO_4$, where Me represents strontium and/or calcium, where $0.005 \leq p \leq 0.30$ and $0 \leq x \leq 0.1$, and where $0 \leq y \leq 0.5$ when at least 75 mole% of Me is Ca and $0 \leq y \leq 0.1$ when less than 75 mole% of Me is Ca. The borate may be used in the luminescent screen of low-pressure mercury vapor discharge lamps.

10 Claims, 2 Drawing Figures

LUMINESCENT LEAD-ACTIVATED ALKALINE EARTH METAL RARE EARTH METAL BORATES AND MERCURY VAPOR DISCHARGE LAMP CONTAINING THE SAME

The invention relates to luminescent lead-activated alkaline earth metal rare earth metal borates, to a luminescent screen comprising a support bearing a luminescent layer containing such a luminescent lead-activated alkaline earth metal borate, and to a low-pressure mercury vapour discharge lamp including such a luminescent screen.

U.S. Pat. No. 2,270,124 discloses a large number of luminescent materials, inter alia lead-activated borates. This specification mentions lead-activated calcium borate and lead-activated cadmium borate, which borates both luminesce with a relatively low intensity in the blue and the yellow portions, respectively, of the spectrum, but the actual compositions and crystal structures of these borates are not specified.

United Kingdom Pat. No. 1,453,991 describes and claims terbium-activated borates of an alkaline earth metal and of a rare earth metal. The host lattice of these borates has a composition defined by the formula $Me_3Ln_2(BO_3)_4$, where Me represents calcium, strontium and/or barium and Ln is a rare earth metal, for example lanthanum. These known borates have an efficient, green Tb luminescence.

It is an object of the present invention to provide efficient, blue-luminescing materials which luminesce efficiently when excited by the ultraviolet radiation generated in a low-pressure mercury vapour discharge.

The invention provides a luminescent lead-activated alkaline earth metal rare earth metal borate having a composition defined by the formula $Me_{1-p}Pb_pLa_{1-x-y}Y_xGd_yBO_4$, where Me represents strontium and/or calcium, wherein $0.005 \leq p \leq 0.30$ and $0 \leq x \leq 0.1$, and wherein $0 \leq y \leq 0.5$ when at least 75 mole% of Me is Ca and $0 \leq y \leq 0.1$ when less than 75 mole% of Me is Ca. Such a luminescent material has significant advantages, for example when used as the blue-luminescing component in the luminescent screen of low-pressure mercury vapour discharge lamps.

A luminescent material according to the invention can be excited efficiently by relatively short-wave ultraviolet radiation. Particularly, it appears that the maximum of the excitation spectrum of these materials is located at a wavelength equal to or very near to the wavelength of the mercury resonant radiation (approximately 254 nm). These luminescent materials furnish a very efficient blue emission consisting of a comparatively wide band (half-value width 115 to 120 nm) with a maximum at 465 to 470 nm.

The host lattices of the borates according to the invention, $MeLaBO_4$, are novel compounds. From X-ray diffraction analysis of these crystalline materials, it appeared that they have a hexagonal crystal structure and that they are isomorphic with compounds such as $BaMgSiO_4$ and $BaAl_2O_4$. The choice of the alkaline earth metal to be used for Me appears to have only a small influence on the lattice parameters of the borate. (The measured lattice parameters are for $SrLaBO_4$: $a = b = 5.235 \pm 0.005$ and $c = 8.805 \pm 0.009$, and for $CaLaBO_4$: $a = b = 5.202 \pm 0.011$ and $c = 8.712 \pm 0.022$). From the general formula given above for the luminescent materials according to the invention, it will be seen that the lanthanum may be partly replaced by yttrium and/or gadolinium. It was found that when replacing up to a maximum of 10 mole% La by Y, the original crystal structure is retained and substantially no changes occur in the luminescent properties of the material. If more than 10 mole% Y were used, it appears that side phases would be formed, which is not wanted. If Me is predominantly ($\geq 75$ mole%) Ca, it appears that a replacement of up to 50 mole% of the La by Gd is possible while retaining the above-mentioned hexagonal crystal structure and the luminescent properties. For materials wherein more than 25 mole% of Me is Sr, it appears that a smaller amount of the La may be replaced by Gd. If in this case not more than 10 mole% of the La is replaced by Gd, the hexagonal crystal structure is retained.

The above-mentioned limits for the lead content p have been chosen since for values of p which are below 0.005, the luminous fluxes obtained are too low and for values of p exceeding 0.30, the quantum efficiency becomes too small owing to concentration quenching.

Preference is given to luminescent lead-activated alkaline earth metal rare earth metal borates defined by the general formula, where Me is strontium and $x = y = 0$ ($Sr_{1-p}Pb_pLaBO_4$), as these materials furnish the highest luminous fluxes.

A luminescent lead-activated alkaline earth metal borate according to the invention may be used in a luminescent screen comprising a support bearing a luminescent layer containing a luminescent lead-activated alkaline earth metal rare earth metal borate. Such a luminescent screen may be, for example a luminescent screen of a low-pressure mercury vapour discharge lamp. Used in combination with other luminescent materials, particularly with a green-luminescing and a red-luminescing material, lamps are then obtained for general illumination purposes which have a high efficiency and very good colour rendering properties.

Figure 2:
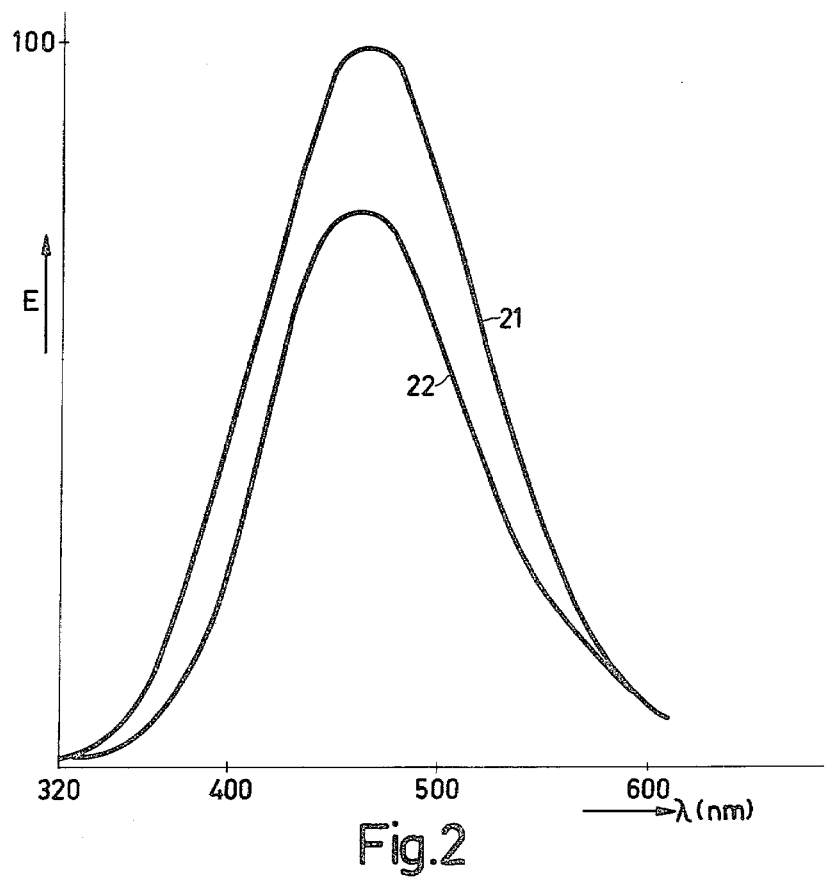

Some embodiments of the invention will now be described with reference to the following Examples, and to the accompanying drawing, in which:

FIG. 1 is a schematic longitudinal section of a low-pressure mercury vapour discharge lamp having a luminescent screen including a luminescent lead-activated alkaline earth metal rare earth metal borate according to the invention and FIG. 2 shows the spectral energy distribution of the emitted radiation of two luminescent lead-activated alkaline earth metal rare earth metal borates according to the invention.

FIG. 1 shows a low-pressure mercury vapour discharge lamp having a glass envelope 1. Electrodes 2 and 3 are disposed one at each end of the lamp, between which electrodes the discharge is maintained. The envelope 1 also serves as the support for a luminescent layer 4 located on the inner side of the envelope 1. The luminescent layer 4 comprises a luminescent lead-activated alkaline earth metal rare earth metal borate according to the invention and may be applied to the envelope 1 by a method which is conventional in the art.

The luminescent lead-activated alkaline earth metal rare earth metal borates according to the invention can be prepared by means of a solid state reaction at a high temperature. The starting material is a mixture of the composite oxides or of compounds producing these oxides when heated. It is particularly advantageous to perform the heating of the starting mixture in two or more stages, after each heating operation, the product obtained being coded and then pulverized. The heating operations can be performed in the air. It appeared that the best results, particularly as regards the formation of the desired hexagonal phase without the occurrence of unwanted other phases, are obtained if a 100% excess of both the boron (for example as boron oxide or boric acid) and of the lanthanum (for example as lanthanum oxide) are present in the starting mixture. After the (last) heating operation these excess materials are removed from the product obtained, for example by means of washing with a boiling $NH_4Cl$ solution.

EXAMPLE 1

A mixture is made of
1.420 g $SrCO_3$
3.258 g $La_2O_3$ (100 mole% excess)
1.237 g $H_3BO_3$ (100 mole% excess)
0.112 g $PbO$.

This mixture was heated at 1000° C. for 1 hour in a furnace in air. After cooling and pulverizing, the product was heated in air for 2 hours at 1250° C. After cooling the product obtained was washed with a boiling $NH_4Cl$ solution in order to remove the excess $La_2O_3$. It appeared that the luminescent $B_2O_3$ (formed from the excess $H_3BO_3$) and lead-activated borate thus obtained had the formula $Sr_{0.95}Pb_{0.05}LaBO_4$. Curve 21 in FIG. 2 shows the spectral energy distribution of the emitted radiation of this material on excitation by short-wave ultraviolet radiation (predominantly 254 nm). In FIG. 2, the wavelength, $\lambda$ in nm, is plotted on the horizontal axis and the intensity, E, of the emitted radiation is plotted on the vertical axis in arbitrary units. It appeared that the emission maximum is at 470 nm and the half-value width is 120 nm. The quantum efficiency of this material is 60%. X-ray diffraction analysis showed that the material has a hexagonal crystal structure (isomorphic with $BaAl_2O_4$).

EXAMPLE 2

By using 0.953 g $CaCO_3$ instead of the $SrCO_3$ used in Example 1, a luminescent lead-activated alkaline earth metal rare earth metal borate having a composition defined by the formula $Ca_{0.95}Pb_{0.05}LaBO_4$ was obtained in a manner which was identical in all other respects. Curve 22 of FIG. 2 shows the spectral energy distribution of the radiation (254 nm excitation) emitted by this material. The emission maximum is located at 465 nm and the half-value width is 115 nm. The quantum efficiency is approximately 50%.

In order to check the influence of the lead content, p, on the luminescent properties of the borates according to the invention, a number of materials were prepared in accordance with the method described in Example 1, wherein p, however, was varied. It appeared that the emission spectra of these materials were the same as that of the material of Example 1. Table I summarizes the measurements of the value of the luminous flux of these materials. Next to the lead content, p, Table I shows for each Example the relative luminous flux, LO, in a percentage figure relative to a standard luminescent material. A blue-luminescing, antimony-activated calcium halophosphate, which luminesces in the same portion of the spectrum, was used as this standard.

TABLE I

| Example | p | LO (in %) |
|---|---|---|
| 3 | 0.02 | 77 |
| 4 | 0.03 | 82 |
| 5 | 0.04 | 82 |
| 6 | 0.05 | 83 |
| 7 | 0.06 | 84 |
| 8 | 0.08 | 88 |
| 9 | 0.10 | 84 |
| 10 | 0.20 | 85 |
| 11 | 0.30 | 66 |

In a similar manner as described in Examples 1 and 2 borates were prepared wherein the lanthanum was partly replaced by yttrium or gadolinium. The following Table II shows the formulaes of the materials thus obtained, as well as the results of the measurements of the relative luminous flux.

TABLE II

| Example | Formula | LO (in %) |
|---|---|---|
| 12 | $Sr_{0.95}Pb_{0.05}LaBO_4$ | 83 |
| 13 | $Sr_{0.95}Pb_{0.05}La_{0.9}Gd_{0.1}BO_4$ | 81 |
| 14 | $Sr_{0.95}Pb_{0.05}La_{0.9}Y_{0.1}BO_4$ | 77 |
| 15 | $Ca_{0.95}Pb_{0.05}La_{0.9}Gd_{0.1}BO_4$ | 56 |
| 16 | $Ca_{0.95}Pb_{0.05}La_{0.7}Gd_{0.3}BO_4$ | 51 |
| 17 | $Ca_{0.95}Pb_{0.05}La_{0.5}Gd_{0.5}BO_4$ | 53 |
| 18 | $Ca_{0.95}Pb_{0.05}La_{0.9}Y_{0.1}BO_4$ | 48 |
| 19 | $Ca_{0.95}Pb_{0.05}LaBO_4$ | 50 |

What is claimed is:

1. A luminescent lead-activated alkaline earth metal rare earth metal borate having a hexagonal crystal structure and a composition defined by the formula

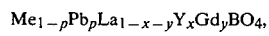
$Me_{1-p}Pb_pLa_{1-x-y}Y_xGd_yBO_4$, wherein Me represents strontium and/or calcium, where $0.005 \leq p \leq 0.30$ and $0 \leq x \leq 0.1$, and wherein $0 \leq y \leq 0.5$ when at least 75 mole% of Me is Ca and $0 \leq y \leq 0.1$ when less than 75 mole% of Me is Ca and exhibiting an emission maximum of 465–470 nm.

2. A luminescent lead-activated alkaline earth metal rare earth metal borate as claimed in claim 1, characterized in that Me is Sr and $x=y=0$.

3. A luminescent lead-activated alkaline earth metal rare earth metal borate of claim 1 of the formula $Sr_{0.95}Pb_{0.05}LaBO_4$.

4. A luminescent lead-activated alkaline earth metal rare earth metal borate of claim 1 of the formula $Ca_{0.95}Pb0.05LaBO_4$.

5. A luminescent lead-activated alkaline earth metal rare earth metal borate of claim 1 of the formula $Sr_{0.95}Pb_{0.05}La_{0.9}Gd_{0.1}BO_4$.

6. A luminescent lead-activated alkaline earth metal rare earth metal borate of claim 1 of the formula $Sr_{0.95}Pb_{0.05}La_{0.9}Y_{0.1}BO_4$.

7. A luminescent lead-activated alkaline earth metal rare earth metal borate of claim 1 wherein p is 0.08.

8. A luminescent lead-activated alkaline earth metal rare earth metal borate of claim 1 wherein p is 0.20.

9. A luminescent lead-activated alkaline earth metal rare earth metal borate of claim 1 wherein p is 0.03.

10. A low-pressure mercury vapor discharge lamp containing the luminescent lead-activated alkaline earth metal rare earth metal borate of claim 1.

* * * * *